United States Patent Office.

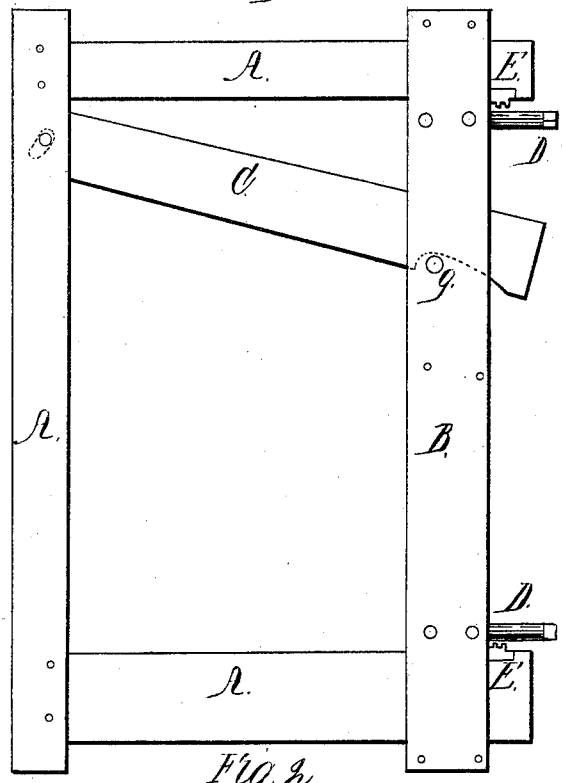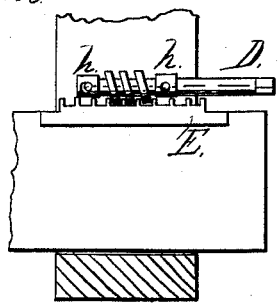

WILLIAM R. ANDREWS AND ROBERT DINGWELL, OF NEWARK, NEW JERSEY.

Letters Patent No. 82,063, dated September 15, 1868.

IMPROVED LEATHER-STRETCHING MACHINE.

The Schedule referred to in these Letters Patent and making part of the same.

TO ALL WHOM IT MAY CONCERN:

Be it known that we, WILLIAM R. ANDREWS and ROBERT DINGWELL, of the city of Newark, in the county of Essex, and in the State of New Jersey, have invented a new Improvement in Leather-Stretching Machine; and do hereby declare that the following is a full, clear, and exact description thereof, reference being had to the accompanying drawings, and the letters of reference marked thereon.

In the annexed drawings, making part of this specification, A A represent the base and end-pieces of my leather-stretcher.

The base is composed of two parallel slats or beams, fastened to or between the ends, of which the end-pieces are strongly secured.

Between the slats or beams, which comprise the base, we pivot the piece C, as will be hereinafter described.

The end-pieces A A have secured to one side of them ratchet-bars, E, as shown in the drawings.

B represents a movable beam, also composed of two slats held at a suitable distance apart by stay-blocks, through which said slats are bolted together.

Between the two slats or beams, composing the movable beam B, we secure, in suitable bearings, $h\,h$, a screw-shaft, D, the thread of which catches and works in the ratchet-bar E, and thereby raises or depresses the beam B, by which the leather is stretched.

C represents a movable bar, which is pivoted at the base, A, through a suitable slot, so that its lower end may work back and forward slightly.

The upper end of the bar C is made in the form shown, and rests upon the friction-roller $g$, so that when the beam B is drawn out so as to stretch the hide one way, the bar C will stretch the neck the other way when properly adjusted thereon.

The screw-shafts D D may be operated by cranks or in any other suitable manner.

It will be seen that by our device the screw D and ratchet-bar E are arranged so as to be entirely out of the way of the leather while stretching the same.

The ratchet-bars E E are made with square notches, and the thread of the screws D D is made square, to correspond with and work therein.

Having thus fully described our invention, what we claim as new, and desire to secure by Letters Patent, is—

1. The movable beam B, in combination with the cross-slat C, when constructed and operated substantially as and for the purpose set forth.

2. Operating the movable beam B by means of the ratchet-bars E E and screws D D, when constructed and arranged as specified, and for the purposes set forth.

In testimony that we claim the foregoing, we have hereunto set our hands, this 21st day of February, 1868.

WM. R. ANDREWS,
ROB'T DINGWELL.

Witnesses:
 JOS. MINK,
 JOHN ARBUCKLE.